United States Patent [19]

Vilhauer, Jr.

[11] Patent Number: 4,906,051

[45] Date of Patent: Mar. 6, 1990

[54] EASILY ACTIVATED AND DEACTIVATED TRACTION DEVICE FOR VEHICLES

[76] Inventor: Jacob E. Vilhauer, Jr., 3325 S.W. 44th, Portland, Oreg. 97221

[21] Appl. No.: 824,668

[22] Filed: Jan. 31, 1986

[51] Int. Cl.$^4$ ............................................. B60B 15/26
[52] U.S. Cl. ................... 301/38 R; 301/45; 301/51
[58] Field of Search ............... 301/38 R, 38 S, 40 R, 301/40 S, 41 R, 43, 44 R, 44 T, 45–51; 180/15; 446/448, 457, 465; 340/825.72

[56] References Cited

U.S. PATENT DOCUMENTS

| | | | |
|---|---|---|---|
| 2,044,812 | 6/1936 | Roessel | 301/47 |
| 2,094,425 | 9/1937 | Cook | 301/49 |
| 2,174,944 | 10/1939 | Leggett | 301/40 X |
| 3,356,171 | 12/1967 | Cichetti | 301/48 X |
| 3,458,236 | 7/1969 | Winsen | 301/47 |
| 3,995,909 | 12/1976 | van der Lely | 301/47 |
| 4,291,922 | 9/1981 | Dolibois | 301/38 S X |
| 4,446,460 | 5/1984 | Tholl et al. | 340/825.72 |
| 4,547,173 | 10/1985 | Jaworski et al. | 446/457 |
| 4,558,897 | 12/1985 | Okuyama et al. | 296/1 S |
| 4,601,519 | 7/1986 | D'Andrade | 301/45 |
| 4,603,916 | 8/1986 | Granryd | 301/45 |

FOREIGN PATENT DOCUMENTS 6368 of 1905 United Kingdom ............. 301/40 S

Primary Examiner—Russell D. Stormer
Attorney, Agent, or Firm—Chernoff, Vilhauer, McClung & Stenzel

[57] ABSTRACT

An auxiliary traction device for vehicle wheels to enhance their traction and braking characteristics under ice and snow conditions. The device comprises a frame which mounts to the outer side of the wheel, connected thereto preferably by the conventional lug bolts so as to rotate in unison with the wheel. Traction members are movably mounted on the frame so as to be selectively extensible into road-engaging positions and retractable when not needed. When extended, the traction members engage the road resiliently so as not to interfere with the normal cushioning action of the tire. Extension and retraction of the traction members may be accomplished either by manual actuation, or by automatic actuation from the driver's station.

10 Claims, 2 Drawing Sheets

EASILY ACTIVATED AND DEACTIVATED TRACTION DEVICE FOR VEHICLES

BACKGROUND OF THE INVENTION

The present invention relates to improvements in auxiliary devices for increasing the traction and braking capabilities of vehicles under ice and snow conditions.

In the past, only two major types of devices for increasing the traction and braking capabilities of vehicles under ice and snow conditions have proven to be practical. These are tires having special snow-type treads, usually with studs to provide traction on ice, and crosslink devices which attach to the tire and stretch transversely across the tread surface, commonly referred to as "tire chains."

While studded snow tires are helpful on icy surfaces, their effectiveness on surfaces having substantial snow accumulation is limited. Moreover, their studs cause a high degree of damage to roads and highways, and therefore they can remain on the vehicle only during the winter months, requiring vehicle owners to change between stud-type and studless tires twice each year, which is bothersome and costly.

Tire chains are far more effective under snow accumulation conditions than are studded snow tires. However, they cannot be driven on road surfaces having no snow accumulation without quickly wearing and breaking. In most cases, the problem is aggravated by the fact that side roads remain snow covered after main highways have become bare, presenting the ordinary commuter with the dilemma of whether to use his chains or remove them. Unfortunately, the chains are quite difficult to install, normally requiring a person to lie on the ground, and are not much easier to remove, leading most motorists to try first to drive without them and install them only after serious difficulty is encountered. As a result, significant numbers of motorists each winter sustain vehicle damage and physical injury from collisions with other vehicles under snow conditions.

Despite the foregoing obvious deficiencies of snow tires and tire chains, no commercially viable, improved alternative for the ordinary automobile has been developed. Attempts have been made to find viable alternatives as evidenced, for example, by the traction devices shown in U.S. Pat. Nos. 1,361,331, 2,562,758, 2,924,486, 3,184,268 and 3,356,171. Such devices have not succeeded commercially for numerous reasons. Their installation on the vehicle is difficult and costly, largely because they require major alteration to the vehicle due to the requirement that they be placed on the interior side of each vehicle wheel, necessitating major reconstruction of the wheel and axle assembly to render them functional. Additionally, they cannot perform their traction functions while retaining the cushioning function of the pneumatic tire; instead, they substitute a rigid interconnection between the vehicle axle and their traction members, eliminating the resilient interconnection normally provided by the tire. This not only significantly increases the roughness of the ride of the vehicle when such devices are in use (far more so than tire chains which retain much of the cushioning function of the tire), but also causes sever impact loading of the traction members, greatly limiting their resistance to wear and fracture. Moreover, such devices are not readily adaptable to different sizes of wheels, and require the difficult and complicated installation of rotary electrical couplings if they are to be remotely or automatically actuatable.

SUMMARY OF THE PRESENT INVENTION

The present invention overcomes all of the foregoing deficiencies of the prior art. It provides an auxiliary traction device mountable to the exterior, rather than the interior, surface of the wheel, preferably by means of the conventional wheel-attaching lug bolts. The device can simply be attached by the lug bolts to the exterior of the wheel at the beginning of the winter season, and removed in the spring, all with less effort than it would take to install a set of tire chains for only temporary use. The device has a plurality of selectivity extensible and retractable road-engaging traction members which, when no ice or snow conditions exist, are merely retained in their retracted positions rotating with the wheel but not touching the road surface. When ice or snow conditions are encountered, the traction members may be easily extended into contact with the road surface, either by momentary stopping of the car to extend them manually or, optionally, by an automatic power-actuation assembly which enables extension or retraction of the members to be controlled remotely from the driver's seat. Since the traction members of the present invention preferably include both studs for icy surfaces and large cleats for snow-covered surfaces, the device effectively replaces both studded tires and tire chains.

The aforementioned problem, whereby prior extensible and retractable traction devices eliminated the normal cushioning of the pneumatic tire, is overcome by the provision in the present invention of biasing means urging the traction members toward their respective extended, road-engaging positions but permitting them to yield retractably from such positions in response to engagement of the traction members with the road. This feature preserves the smoothness of the ride, enabling the vehicle to operate at high speeds without discomfort when the traction members are in their extended, road-engaging positions, and minimizes the susceptibility of the traction device to wear and breakage when in use.

As an adjunct to the cushioning feature of the traction device, at least a portion of the cushioning is automatically eliminated under braking conditions, where it is desirable to bring a greater portion of the weight of the vehicle to bear on the traction members to increase braking.

To further aid in making the present invention commercially practical, features are provided for selectively adjusting the degree of extension of the traction members and the degree of cushioning, in order to render the device adaptable to a wide range of different vehicles having different wheel sizes and weights. Moreover, the structure for attaching the device to the lug bolts is such as to render the device readily adaptable for attachment to different lug bolt patterns.

In the simple, nonautomatic version of the present invention, the traction members may be extended or retracted within second merely by the twist of an ordinary lug wrench. Alternatively, in the automatically-actuated version of the invention, both extension and retraction are instantly controllable remotely from the driver's seat by radio control, such that no electrical conduits between the vehicle and the rotating traction device is necessary.

The foregoing objectives, features and advantages of the present invention will be more readily understood

DESCRIPTION OF THE PREFERRED EMBODIMENT

Manually-Actuated Embodiment

Figure 1:
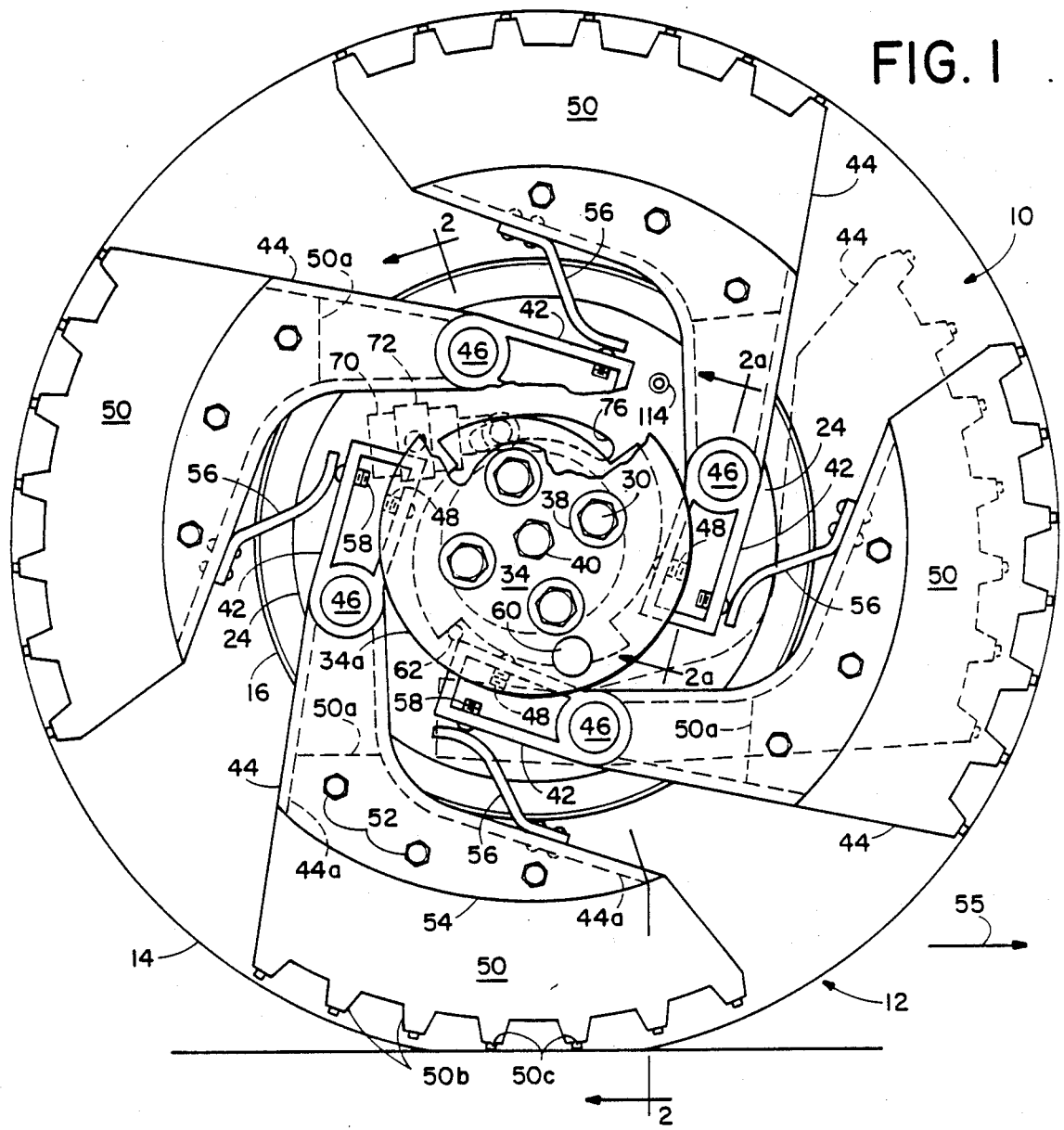
FIG. 1 is a side view of an exemplary, manually-operated embodiment of the traction device of the present invention, with optional modification to convert such embodiment to automatic operation being shown in phantom.
Figure 2A:
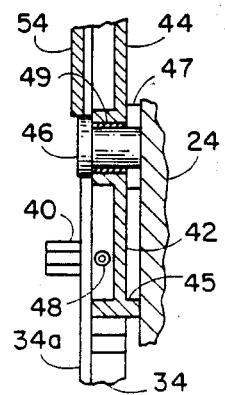
FIG. 2a is a sectional view taken along line 2a—2a of FIG. 1.
Figure 2:
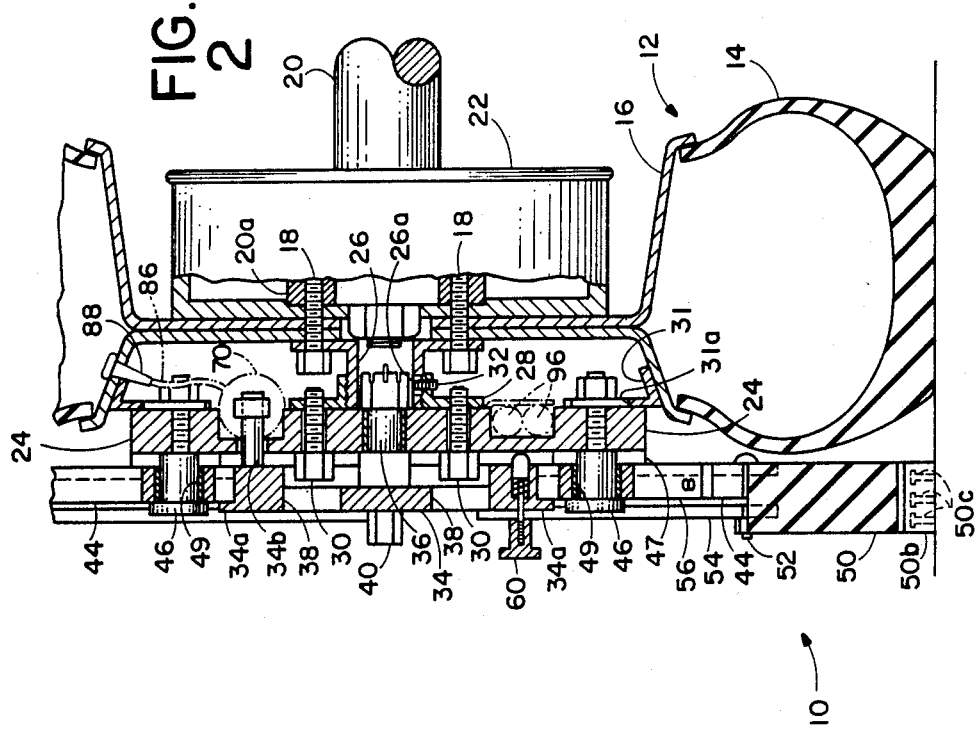
FIG. 2 is a sectional view taken along line 2—2 of FIG. 1.

The traction device, designated generally as 10 in FIGS. 1 and 2, is shown mounted on the exterior side of an exemplary drive wheel 12 of a vehicle. The wheel 12 comprises a standard pneumatic tire 14 mounted on a conventional steel rim 16. The rim 16 is fastened by lug bolts 18 to the hub 20a of a drive axle 20, the lug bolts 18 extending through a conventional shoe-type brake drum 22. It should be understood that the type of vehicle wheel is immaterial to the present invention. The wheel may be either a front or rear drive wheel, and the lug bolts 18 may be either of the type affixed to an axle hub and extending outwardly, as shown in FIG. 2, or of the type insertable inwardly into threaded sockets in the axle hub. The configuration and spacing of the bolt pattern is likewise immaterial, as is the size of the vehicle wheel.

The traction device 10 comprises a generally disk-shaped frame 24 attached to the lug bolts 18 by a two-piece coupling comprising a first tubular flanged coupling portion 26 detachably engaging a second flanged tubular coupling portion 28 by any suitable connecting means, such as screw threads. The portion 28 is fastened to the frame 24 by bolts 30. Relative rotation at the threaded connection between the portion 26 and the portion 28 can be prevented by any conventional means, such as one or more Allen screws 32 extending transversely through one or more threaded sockets in the portion 28 into axially extending slots 26a in the coupling portion 26. This enables the coupling to transmit torque from the axle hub 20a to the frame 24, causing the frame 24 to rotate in unison with the wheel 12. The purpose of the two-piece coupling is to permit various different configurations of coupling portions 26 to be provided to match respective lug bolt patterns and spacings of different vehicles. The different coupling portions 26 can then engage a universal coupling portion 28 through a universal connection of any suitable type, such as the threaded connection shown. Thus, the entire traction device, other than the individual special coupling portion 26, may be constructed to a single universal design to fit a large range of vehicles. For deep wheel rims, such as those on trucks or buses, peripherally-spaced rim abutment members such as 31 may be optionally provided so that the frame 24 receives additional vertical support from the rim. The radial extension of each such rim abutment member 31 is preferably adjustable by means of a radially-extending slot 31a in the member.

At the center of the frame 24, aligned with the axis of rotation of the wheel 12, a four-lobed cam 34 is rotatably mounted by a journal member 36. The cam 34 has apertures 38 through which access to the bolts 30 is available for purposes of attaching or detaching the frame 24 to the coupling portion 28. A hexagonal bolt head 40, preferably of the same size as that of the vehicle's lug nuts or lug bolts, and of the bolts 30, is affixed to the cam 34 to enable the cam to be manually rotated bidirectionally relative to the frame 24 by applying the vehicle's lug wrench, or any other suitable wrench.

The four lobes of the cam 34 engage respective lever arms 42 of respective traction members 44, which are pivotally mounted to the frame 24 by bushings or bearings 49 journalled on respective pivot pins 46. By selective rotation of the cam 34 by means of the wrench-engaging head 40, the traction members 44 may be pivoted relative to the frame 24 between extended, ground-engaging positions substantially as shown in solid lines in FIGS. 1 and 2, and retracted, disengaged positions substantially as shown in phantom in FIG. 1.

The maximum degree of radial extension of the traction members is adjustable in several ways to accommodate different wheel diameters. First, adjustment of Allen screws 48, threaded through outwardly protruding flanges in the lever arms 42 to serve as the cam followers for the lever arms, adjusts the extended positions of the traction members for any particular rotary orientation of the cam 34. Second, the size of the traction members 44 themselves can be varied since the ground-engaging portion 50 of each traction member is removable and replaceable with respect to the upper, pivoted portion of the traction member, and may thereby be provided in different sizes of different variable radial dimensions suitable for use with different wheel diameters. Each ground-engaging portion 50, which may be of metal but is preferably of a tough, abrasion-resistant plastic material such as ABS plastic, nylon or other suitable material, has an apertured upper section 50a through which bolts such as 52 extend from the rear side of the pivoted, upper metallic portion of the respective traction member. The metallic upper portion of the traction member includes outwardly protruding flanges 44a and a removable front plate 54 (through which the bolts 52 likewise extend) thereby forming an extremely sturdy, four-sided pocket for holding the insertable upper section 50a of the ground-engaging portion 50 in fixed relationship to the remainder of the traction member.

The ground-engaging, replaceable portions 50 of the traction members 44 may be made in any of various configurations best suited for the expected weather conditions. The configuration shown in the figures is an all-purpose one for both snow and ice. Large transverse cleats 50b provide traction and braking in situations where the road surface is covered with an accumulation of snow. Studs 50c protrude from each cleat to provide traction and braking for icy road conditions.

The force with which the traction members engage the road surface is determined, when in a forward driving mode indicated by the arrow 55 in FIG. 1, by the biasing force of leaf springs 56 which are riveted or otherwise fixed at one end to an outwardly-protruding flange 44a of the metallic, upper portion of a respective traction member. The opposite end of each leaf spring 56 slidably engages a respective lever arm 42 of the next adjacent traction member. Preferably, the slidable engagement is with respect to another adjustable Allen screw 58 of the lever arm, by which the spring force can be adjustably raised or lowered thereby varying the amount of biasing force imposed on the traction members. The greater the stiffness of the springs 56, the greater will be the traction assist provided by the traction members 44.

The springs 56 yieldably force a separation between the flange 44a of one traction member 44 and the lever arm 42 of the next adjacent traction member. The result is yieldable urging of each traction member 44 toward its extended, road-engaging position, such extended position being limited only by the abutment of the lever arm 42, through one of the Allen screws 48, with the cam 34. The action of the springs 56 can be best understood by consideration of the lowermost traction member 44 of FIG. 1, which is shown in engagement with the road surface. Such engagement tends to pivot the traction member counterclockwise about its respective pivot pin 46, tending to decrease the separation both between its flange 44a and the lever arm 42 of the traction member to its right, and between its own lever arm 42 and the flange 44a of the traction member to its left. Thus, both its own attached spring, and the spring separating its lever arm 42 from the traction member immediately to its left, act in concert to yieldably urge the lowermost traction member into contact with the road surface. As seen in FIG. 1, the contact with the road surface pivots the lowermost traction member slightly counterclockwise so that its lever arm 42 is no longer in contact with the cam 34. This action provides a desirable cushioning effect, preserving the cushioning effect of the pneumatic tire, and protecting the traction members 44 and frame 24 against absorbing the full weight of the vehicle as an impact load every time a traction member contacts the road surface. The latter serves to protect the traction members and frame 24 against undue abuse which would otherwise quickly lead to wear and breakage of the traction device.

A major reason why the traction members 44 yield in a resilient fashion when the vehicle is being driven forward (i.e. in the direction of the arrow 55 of FIG. 1) is that the road-engaging surfaces of the traction members and the respective pivot pins 46 of the traction members are offset angularly from each other about the axis of rotation of the wheel, causing both vertical road engagement reaction and horizontal driving reaction to exert a counterclockwise moment on the traction member. However, if the wheel is in a forward braking mode, as opposed to a forward driving mode, the reaction of the traction member is different. Although road engagement reaction still causes a counterclockwise moment on the traction member due to the weight of the vehicle, the horizontal braking force imposed an opposite, clockwise moment on the traction member, thereby tending to impose more weight of the vehicle on the traction member in the forward braking mode than in the forward driving mode. This is desirable, since the braking mode is the mode in which the greater traction is required, for example to avoid sliding into another vehicle or obstacle under emergency conditions. Thus, in the forward braking mode, the traction device automatically imposes a greater proportion of the vehicle's weight on the traction member (at the expense of cushioning) while in the forward driving mode the device retains the desirable, cushioned traction characteristic.

FIG. 2a shows the structure by which deflection of the traction members 44 in the axial, or lateral, direction is minimized. The head of each pivot pin 46, and a washer 47 which spaces each traction member 44 outwardly from the frame 24, provide bidirectional resistance to axial deflection at the pivot pin 46 itself. However, such resistance may be insufficient to withstand lateral bending stress imposed on the traction members by lateral forces tending to skid the vehicle sideways. Accordingly, bidirectional resistance against such bending stress is also provided on the end of each lever arm 42, at a position spaced from its respective pivot pin 46, by virtue of an inwardly-projecting flange 45 by which the lever arm slidably engages the frame 24, and a peripheral flange 34a on the cam 34 by which the cam slidably engages the exterior of the respective lever arm. Thus, the frame 24, in cooperation with the head of the pivot pin 46, resists lateral bending stress on the respective traction member 44 in one direction, while the cam 34, in cooperation with the washer 47, resist lateral bending stress on the traction member in the opposite direction.

When there are no ice or snow conditions necessitating use of the traction device, the cam 34 is rotated, by wrench engagement of the nut head 40, in a clockwise direction as seen in FIG. 1, forcing all of the lever arms 42 radially outwardly and retracting the traction members simultaneously into positions disengaged from the road surface as indicated in phantom in FIG. 1. Such clockwise rotation of the cam 34 moves an inwardly spring-biased, sliding latch pin 60 into alignment with a mating aperture 62 in the frame 24, where the pin 60 springs into the aperture thereby locking the cam 34 in position to maintain the traction members 44 in their retracted positions. When it is once more desired to use the traction device, application of the wrench to the head 40 momentarily in a clockwise direction to relieve pressure on the pin 60, while simultaneously grasping the head of the latch pin 60 so as to retract the pin from the aperture 62, and subsequent counterclockwise rotation of the cam 34, will once more place the traction members 44 in their extended, yieldable, road-engaging positions. The foregoing manually-operated embodiment of the invention, although simple in structure, enables selective activation and deactivation of the traction device merely in a matter of seconds, and with no effort or inconvenience other than requiring momentary stopping of the car so that the driver can get out and apply the wrench to the nut head 40.

AUTOMATICALLY-ACTUATED EMBODIMENT

A second embodiment of the device can, if desired, provide fully automatic activation and deactivation of the device from the driver's seat in instant response to a driver command, without requiring the driver to get out of the vehicle. In addition to being more convenient than the manually-operated embodiment, the automatic embodiment has several safety advantages in not requiring the driver to leave the car and walk on the roadway under dangerous weather conditions, and in permitting him instantly to obtain needed traction or braking if he should suddenly and unexpectedly find himself out of control due to an unforeseen slippery road condition.

Figure 3:
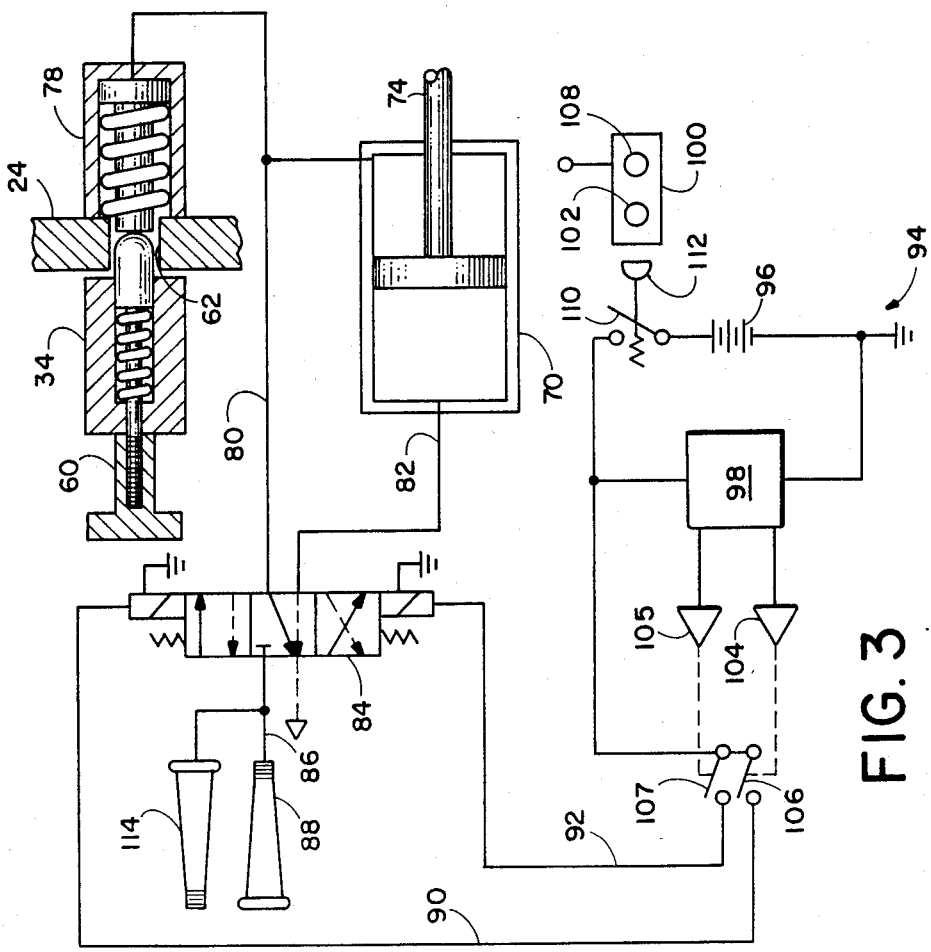
FIG. 3 is a schematic diagram of an exemplary power actuation system suitable for the optional, automatically-actuated embodiment of the invention.

The automatically-actuated embodiment of the traction device essentially requires only the addition of certain elements to the manually actuated embodiment previously described. Thus, the automatically-actuated embodiment requires substantially no change in any of the previously-described components of the unit, and can alternatively be manually actuated in the manner previously described if the power actuation system should become inoperable for any reason. The additional elements necessary for the power-actuated embodiments are shown in FIG. 3 and, in phantom, in FIGS. 1 and 2.

Power actuation is accomplished by one or more pneumatic, double-acting, power cylinder assemblies such as 70 (only one of which is shown), each attached pivotally by a bracket 72 (FIG. 1) to the interior surface of the frame 24. The piston rod 74 of the cylinder assembly 70 is connected to an arm 34b (FIG. 2) rigidly fixed to the cam 34 and extending inwardly therefrom through an arcuate slot 76 formed in the frame 24. (If more actuating force is needed than can be supplied by a single cylinder assembly, one or more additional cylinder assemblies can be similarly connected to the cam 34 in the other quadrants surrounding the rotary axis of the cam 34, such additional assembly or assemblies being pneumatically connected in parallel with the cylinder assembly 70.) Extension of the piston rod 74 rotates the cam 34 clockwise so as to retract the traction members 44, while retraction of the piston rod 74 rotates the cam counterclockwise so as to extend the traction members.

Additionally, a single-acting, spring-retracted pneumatic cylinder assembly 78 (FIG. 3) is mounted to the interior surface of the frame 24 with its plunger aligned with and insertable into the aperture 62 which accepts the latch pin 60 described previously.

Pneumatic cylinder assemblies 70 and 78 are connected by pneumatic lines 80 and 82 to a three-position, spring-centered, solenoid-actuated pneumatic valve 84 which receives pressurized air from a pneumatic line 86 preferably screwed onto the conventional valve stem 88 of the pneumatic tire 14, holding the valve of the stem 88 open. The three-way, solenoid-actuated valve 84 is controlled through electrical lines 90, 92 by a battery-powered controller 94 fastened at any convenient location to the interior surface of the frame 24. The controller's power source batteries 96 are likewise attached to the interior of the frame 24.

The controller 94 comprises a conventional radio receiver 98 which receives signals from a transmitter 100 attached at any convenient location in the driver's compartment. In response to an "activate" signal from the transmitter 100, generated by the driver's pressing of button 102, the receiver 98 transmits a first signal through amplifier 104 to relay 106, causing an electrical current in line 90 which shifts the spool of solenoid valve 84 downward in FIG. 3 so as to expose pneumatic line 80 to the pressurized air in line 86 while permitting line 82 to be exposed to atmosphere. This extends the plunger of cylinder assembly 78 into aperture 62 while simultaneously imposing retracting force on piston rod 74. Extending the plunger of cylinder assembly 78 into aperture 62 dislodges pin 60, thereby permitting counterclockwise rotation of cam 34 in response to the retraction of piston rod 74, and thus extending the traction members 44 under the influence of springs 56. Only momentary depression of the button 102 is necessary to achieve extension of the traction members, after which the button can be released allowing valve 84 to return to its spring-centered position where no battery energy is needed. In the valve's center position, line 86 is closed and cylinder assemblies 70 and 78 are vented to atmosphere, permitting the plunger of cylinder assembly 78 to retract from the aperture 62. As in the manually-operated embodiment, no continuing force need be applied to cam 34 to insure that the traction members 44 remain in their extended positions, since the force imposed by the springs 56 prevents any clockwise rotation of the cam 34.

To retract the traction members 44, the other button 108 of the transmitter 100 is pressed momentarily, sending a different signal to receiver 98 which, through amplifier 105, signals relay 107 to energize line 92 thereby shifting the spool of solenoid valve 84 upward in FIG. 3. Such shifting of valve 84 exposes pneumatic line 82 to the pressurized air in line 86 while permitting line 80 to remain exposed to atmosphere. This extends piston rod 74, rotating cam 34 clockwise and retracting the traction members 44 until latch pin 60 aligns with aperture 62 and snaps into the aperture to lock the cam 34 in its retracting orientation. Again, the actuation of the valve 84 to accomplish retraction can merely be momentary, after which the valve can be permitted to return to its spring-centered position.

As a safety feature, it is desirable to interpose a simple switch 110 in the battery power circuit of the controller 94, such switch being normally closed but being opened in response to centrifugal force imposed upon a mass 112 by wheel rpm exceeding a predetermined limit. This will prevent the accidental extension of the traction members by the driver's accidental actuation of the transmitter 100, or by accidental radio signals from other sources. Also, the transmitter 100 and receiver 98 can be preset to transmit and receive only radio signals in accordance with a predetermined code to eliminate any possible effect of signals from other sources.

It will be recognized that the foregoing automatic actuation system requires no electrical connections or other power connections between the traction device and the vehicle, thereby preserving the simplicity of the installation process. The small volume of pressurized air from the tire 14 needed to actuate the cylinder assemblies 70 and 78 is inconsequential, and the fact that these cylinder assemblies need not be held in position by pressurized air after momentary actuation has occurred virtually eliminates all danger of air leakage from the tire. The device is preferably equipped with an auxiliary valve stem 114 protruding through the frame 24 so as to be easily accessible on the exterior side thereof, for checking the air pressure in the tire and adding air thereto if necessary.

If a source of pressurized air other than the tire 14 is desired for any reason (such as to make the cylinder assemblies operate with greater actuating force requiring higher air pressure than that available from the tire) a small cannister of air at high pressure can be attached to the interior surface of the frame 24 for connection to pneumatic line 86.

The traction device should be rotationally balanced at point of manufacture, particularly the automatically actuated version which will have unsymmetrical actuating components of significant mass. If desired, the wheel can also be balanced with the traction device after installation. Since the major movable portions of the traction device move substantially symmetrically, significant vibration should not develop from retraction or extension of the traction members.

Although the preferred embodiment of the invention is shown with its traction members 44 mounted pivotally to the frame 24, producing the above-mentioned advantages of pivots offset angularly from the road-engaging portions of the traction members, it would be within the scope of the invention for the traction members to be movably mounted to the frame 24 in a linearly-slidable manner, or such as to permit a combination of pivotal and slidable motion of the traction members relative to the frame. Also, central actuating structures other than the cam 34 may be used without departing from the invention, for example, a rotary member pulling rather than pushing to retract the traction members.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a vehicular, road-engaging wheel mounted on a vehicle for rotation about an axis of rotation, an auxiliary traction device comprising:
   (a) a frame mounted on said wheel for rotation in unison therewith;
   (b) a plurality of road-engaging traction members movably mounted on said frame so as to be selectively extensible and retractable radially with respect to said axis of rotation between extended road-engaging positions and retracted disengaged positions; and
   (c) biasing means for forcibly urging said traction members toward their respective extended road-engaging positions and permitting them to yield retractably, separately from one another, from said extended positions;
   (d) said biasing means comprising a plurality of individual springs, each spring being interposed operatively between at least a pair of said traction members for forcibly urging both of said pair of traction members simultaneously toward their respective extended road-engaging positions.

2. The apparatus of claim 1, including means for selectively adjusting said biasing means for varying the amount of force by which said biasing means yieldably urges said traction members toward their extended positions.

3. The apparatus of claim 1 wherein said biasing means includes means for permitting said traction members to yield retractably in response to their engagement with the road surface.

4. In a vehicular, road-engaging wheel mounted on a vehicle for rotation about an axis of rotation, an auxiliary traction device comprising:
   (a) a frame mounted on said wheel for rotation in unison therewith;
   (b) a plurality of road-engaging traction members movably mounted on said frame so as to be selectively extensible and retractable radially with respect to said axis of rotation between extended road-engaging positions and retracted disengaged positions;
   (c) biasing means for exerting biasing force on said traction members urging said members toward their respective extended road-engaging positions and permitting them to yield retractably from their extended positions; and means interconnecting said traction members with said frame for causing more resistance to slip between said traction members and the road surface in response to forward braking of said wheel than in response to forward driving of said wheel by causing forward driving forces, imposed horizontally on said traction members by contact with the road, to oppose said biasing force and causing forward braking forces, imposed horizontally on said traction members by contact with the road, to aid said biasing force.

5. In a vehicular, road-engaging wheel mounted rotatably on a vehicle for rotation about an axis of rotation, an auxiliary traction device comprising:
   (a) a frame mounted on said wheel for rotation in unison therewith;
   (b) a plurality of road-engaging traction members movably mounted on said frame so as to be selectively extensible and retractable radially with respect to said axis of rotation between extended road-engaging positions and retracted disengaged positions;
   (c) a selectively operable actuating member movably mounted on said frame for extending said plurality of road-engaging traction members radially in response to movement of said actuating member; and
   (d) adjustment means for variably adjusting the maximum degree of radial extension of said traction members in their extended road-engaging positions, said adjustment means comprising adjustable means interposed between said actuating member and said traction members for varying the relationship between the degree of movement of said actuating member and the degree of radial extension of said traction members resulting therefrom.

6. In a vehicular, road-engaging wheel mounted on a vehicle for rotation about an axis of rotation, an auxiliary traction device comprising:
   (a) a frame mounted on said wheel for rotation in unison therewith;
   (b) a plurality of road-engaging traction members movably mounted on said frame so as to be selectively extensible and retractable radially with respect to said axis of rotation between extended road-engaging positions and retracted disengaged positions;
   (c) power means mounted for rotation in unison with said wheel for selectively extending and retracting said traction members radially with respect to said axis of rotation;
   (d) radio receiver means mounted for rotation in unison with said wheel for controlling said power means in response to electromagnetic signals; and
   (e) radio transmitter means for controlling said power means by transmitting electromagnetic signals to said radio receiver means;
   (f) said power means and said radio receiver means both being free of any physical connection with any part of said vehicle other than said wheel.

7. The apparatus of claim 6, including solenoid valve means controlled by said radio receiver means and a source of pressurized gas, said solenoid valve means being interconnected by passageways with said power means and with said source of pressurized gas for selectively controlling the passage of said pressurized gas to said power means in response to said radio receiver means.

8. In a vehicular, road-engaging wheel mounted on a vehicle for rotation about an axis of rotation, an auxiliary traction device comprising:

(a) a frame mounted on said wheel for rotation in unison therewith;

(b) a plurality of road-engaging traction members movably mounted on said frame so as to be selectively extensible and retractable radially with respect to said axis of rotation between extended road-engaging positions and retracted disengaged positions;

(c) power means mounted for rotation in unison with said wheel for selectively extending and retracting said traction members radially with respect to said axis of rotation;

(d) radio receiver means mounted for rotation in unison with said wheel for controlling said power means in response to electromagnetic signals;

(e) radio transmitter means for controlling said power means by transmitting electromagnetic signals to said radio receiver means; and (f) wheel speed sensor means connected to said power means for preventing, in response to the speed of said wheel exceeding a predetermined speed limit, said power means for extending said traction members.

9. In a vehicular, road-engaging wheel mounted on a vehicle for rotation about an axis of rotation, an auxiliary traction device comprising:

(a) a frame mounted on said wheel for rotation in unison therewith;

(b) a plurality of road-engaging traction members movably mounted on said frame so as to be selectively extensible and retractable radially with respect to said axis of rotation between extended road-engaging positions and retracted disengaged positions;

(c) said traction members being pivotally mounted on said frame for rotation relative to said frame about respective pivot axes oriented parallel to, and spaced radially around, said axis of rotation of said wheel, each of said pivot axes having a fixed positional relationship relative to said frame and relative to a respective traction member;

(d) each of said traction members including a road-engaging surface, the pivot axis and road-engaging surface of each respective traction member being offset angularly from each other about said axis of rotation of said wheel; and (e) biasing means for forcibly urging said traction members to pivot about said respective pivot axes toward their respective extended road-engaging positions, and permitting said traction members to pivot yieldably about said pivot axes retractably from their extended positions.

10. The apparatus of claim 9, further including means on said frame for engaging each of said traction members at a location spaced from its respective pivot axis so as to prevent deflection of each traction member in a direction parallel to its respective pivot axis.

* * * * *

UNITED STATES PATENT AND TRADEMARK OFFICE
CERTIFICATE OF CORRECTION

PATENT NO. : 4,906,051
DATED : March 6, 1990
INVENTOR(S) : Jacob E. Vilhauer, Jr.

It is certified that error appears in the above-identified patent and that said Letters Patent is hereby corrected as shown below:

Col. 1, line 64   Change "sever" to --severe--

Col. 2, line 23   Change "actuation" to --actuating--

Col. 2, line 60   Change "second" to --seconds--

Col. 3, line  1   Change "for" to --of--

Signed and Sealed this

Seventeenth Day of September, 1991

Attest:

HARRY F. MANBECK, JR.

*Attesting Officer*    *Commissioner of Patents and Trademarks*